US007681197B1

(12) United States Patent
Kinnear

(10) Patent No.: US 7,681,197 B1
(45) Date of Patent: Mar. 16, 2010

(54) NESTED MONITOR HANDLING PROCESSES

(75) Inventor: Karen Kinnear, Boxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1141 days.

(21) Appl. No.: 11/291,713

(22) Filed: Nov. 30, 2005

Related U.S. Application Data

(60) Provisional application No. 60/719,717, filed on Sep. 21, 2005.

(51) Int. Cl.
G06F 9/46 (2006.01)
G06F 3/00 (2006.01)
G06F 7/00 (2006.01)
G06F 12/00 (2006.01)

(52) U.S. Cl. .................. 718/104; 718/100; 718/102; 719/328; 707/8; 710/200

(58) Field of Classification Search ............. 718/102, 718/100, 104, 105; 717/130, 151; 707/8; 710/200; 719/328
See application file for complete search history.

(56) References Cited

U.S. PATENT DOCUMENTS 6,983,461 B2 * 1/2006 Hutchison et al. ........... 718/104
7,035,870 B2 * 4/2006 McGuire et al. ........ 707/103 R
7,209,918 B2 * 4/2007 Li .................................. 707/8
7,536,690 B2 * 5/2009 Alverson et al. ............ 718/102
7,539,678 B2 * 5/2009 Demsey et al. ................ 707/8
2003/0097360 A1 * 5/2003 McGuire et al. ............... 707/8
2004/0006583 A1 * 1/2004 Shaylor et al. .............. 709/102
2005/0273782 A1 * 12/2005 Shpeisman et al. .......... 718/100
2005/0289546 A1 * 12/2005 Shpeisman et al. .......... 718/100
2005/0289549 A1 * 12/2005 Cierniak et al. ............. 718/102

* cited by examiner

Primary Examiner—Meng-Ai An
Assistant Examiner—Tammy Lee
(74) Attorney, Agent, or Firm—Osha • Liang LLP

(57) ABSTRACT

A method of managing nested monitor locks in a computer program is provided for an application having at least a first thread and a second thread wherein a non-synchronized procedure is processed by the application. The first thread executes an outer software module while the second thread executes an inner software module. A processing state of the second thread code is preserved before the second thread is configured to release an outer monitor of the outer software module. The first thread acquires the outer monitor of the outer software module so that actions may be completed. Upon completion of actions by the first thread, the outer monitor of the outer software module is released. The processing state of the second thread is restored, such that, actions of the second thread are allowed to be completed.

7 Claims, 4 Drawing Sheets

NESTED MONITOR HANDLING PROCESSES

CLAIM OF PRIORITY

This application claims priority to U.S. Provisional Patent application No. 60/719,717, filed on Sep. 21, 2005 entitled "Nested Monitor Handling Processes", and is hereby incorporated by reference.

BACKGROUND

1. Field of the Invention

This invention relates generally to computer programming, and more particularly to a method of managing nested monitor locks.

2. Description of the Related Art

High-level programming languages offer features that enable complex tasks to be solved. Java™, for example, offers platform independence, an object orientated programming model, and the ability to distribute processing tasks to multiple threads of operation.

By way of background, Java™ is an interpreted language that utilizes a Java™ Virtual Machine (JVM) as an interpreter. The JVM is a software layer that converts Java™ intermediate language (bytecode) into machine language. A common procedure performed to load an application is to call a class loading library. The class loading library defines the various classes that will be needed to load the application.

Constructing applications that distribute processing tasks among multiple threads of operation requires control over the order in which threads execute. Without this control, critical code or data might be processed by multiple threads simultaneously. The Java™ language provides monitors for mutual exclusion control over critical code sections which can protect data access. As defined herein, monitors provide mutual exclusion, through both the ability to acquire and release ownership of protected code and data structures, and through the use of wait and notify operations. A wait( ) by definition releases a monitor and returns either after a timeout or a notify( ), guaranteed to own the monitor. Thus, a "monitor" will define a mutual exclusion lock with a condition variable.

For this monitor definition, a single thread can acquire a monitor multiple times. This is known as the recursion count. A release of a monitor, only releases a single acquisition, so the same number of releases are required as acquisitions in order to free the monitor for other threads. The wait( ) operation completely frees the monitor, making the monitor available for other threads.

To prevent deadlocks from the use of multiple monitors, the users of these monitors follow lock ordering rules for acquiring these related locks. Specifically, a thread which wants to acquire MI, must first ensure that it has acquired MO. The thread releases the locks in the inverse order, releasing MI, then releasing MO. This generally prevents the classic deadlock situation. We use the abbreviation MO for outer monitor and MI for inner monitor to remind us of the lock ordering rules.

FIG. 1 illustrates a high level diagram 100, which includes a Classloading library 104 being interfaced with JVM 106, which may be part of a computer system 102. In operation, the Classloading library 104 includes APIs, which will enable calls to the JVM 106. In the example, the Classloading library 104 has an example loadClass( ) method that acquires an outer monitor N times. The JVM 106 includes methods, such as JVM internally defined "defineclass( )" method that acquires inner monitors.

The monitors associated with the loadClass( ) method of the Classloading library 104 are called outer monitors (MO), while those associated with the internal defineclass( ) method of the JVM 106 are called inner monitors (MI). Because the monitors exist in inner and outer pairs, they are called nested monitors. An MO is designed to lock critical code or a critical data structure of a higher level method, such as the Classloading library 104, while the MI is designed to lock critical code or a critical data structure of a lower level method, such as the defineclass( ) method of the JVM 106. Traditionally, in the JVM 106, the class loading library API loadClass( ) is implemented as a synchronized procedure, synchronized on the class loader object lock. That is, class loading is performed in a serial manner, traversing through class tree structure hierarchies.

From an application design viewpoint, it is desirable at times to create custom class loaders. Programmers can use these to provide custom class loading methods. Some programmers use these to avoid tree structure hierarchies of class loaders when a problem warrants such a strategy. For some of these cases, this will cause a deadlock situation, and some programmers explicitly break the synchronization in their implementations which then causes class loading on a class loader to be done in parallel instead of serialized. A thread of the application breaks the synchronization by implementing a "wait" on the class loader object lock. Then, another thread of the application processes class loading within the same JVM for that same class loader.

When the JVM needs to load classes for an application, it uses its own internal lock to protect internal class loading objects. In Java™, the defineclass( ) method requires loading all the superclasses of the application's classes. In some JVMs, this process is done recursively, requiring calls out to the application loadClass( ) method for each superclass. For this procedure to work correctly, the initial application thread needs to complete the defineclass( ) processing and other threads need to wait on the initial thread's completion.

Unfortunately, this can cause the JVM to deadlock and consequentially the application will fail to run properly. That is, a situation can occur where one thread is trying to acquire MO, in order to acquire MI and complete an action. The second thread owns the outer monitor (MO) and is waiting on MI for the first thread to complete an action. Due to the lock ordering rules noted above, the first thread must wait for the second thread to release MO in order to proceed, thus the deadlock.

In view of the foregoing, there is a need for a method that allows nested monitor locks to be safely released when custom class loaders break serialized class loading. The method should allow thread safe operation of custom and standard class loaders without having to rewrite the existing class loading library model or rewriting the semantics of Java™.

SUMMARY

Embodiments of the present invention provide a method for managing nested monitor locks in a computer program.

It should be appreciated that the present invention can be implemented in numerous ways, such as a process, an apparatus, a system, a device or a method on a computer readable medium. Several inventive embodiments of the present invention are described below.

Broadly speaking, methods for managing nested monitor locks in a computer program are provided. These methods allow multiple threads waiting for the codependent release of monitor locks to orderly complete processing. The method configures a thread executing inner software module code so that an outer monitor lock may be released without breaking processing logic. A thread associated with outer software module code can then acquire the outer monitor lock to complete processing actions. Once the processing actions are complete, an inner monitor lock is released and then the outer monitor lock is released. The thread executing inner software module code is configured so that it can reacquire the outer monitor lock and the inner monitor lock and then complete processing actions.

In one embodiment, an application having at least a first thread and a second thread executes a non-synchronized procedure. The first thread executes an outer software module while the second thread executes an inner software module. A processing state of the second thread code is preserved before the second thread is configured to release an outer monitor of the outer software module. The first thread acquires the outer monitor of the outer software module so that actions may be completed. Upon completion of actions by the first thread, the outer monitor of the outer software module is released. The processing state of the second thread is restored, such that, actions of the second thread are allowed to be completed.

In another embodiment, an application running multiple threads executes a non-synchronized procedure which enables a first thread to own an action which requires both a monitor of the outer software module and a monitor of the inner software module, and a second thread to acquire a monitor of the inner software module and a monitor of outer software module, but to require the first thread to complete the action it owns. An internal API is called during execution by the second thread to preserve a recursive lock count of the second thread. Once the recursive lock count has been saved, the second thread releases the outer monitor of the outer software module and the inner monitor of the inner software module. The second thread pauses actions until the inner monitor of the inner software module can be reacquired. The first thread acquires the outer monitor of the outer software module and the inner monitor of the inner software module and completes actions.

Once the actions are completed, the first thread releases both the inner monitor of the inner software module and the outer monitor of the outer software module. The first thread notifies the second thread that the inner monitor of the inner software module has been released. After the second thread receives the notification, the second thread releases the inner monitor of the inner software module. The internal API is called to reacquire the outer monitor of the outer software module and to restore the recursive lock count of the second thread. The second thread may then complete actions after the second thread reacquires the outer monitor of the outer software module and the inner monitor of the inner software module. Other aspects of the invention will become apparent from the following detailed description, taken in conjunction with the accompanying drawings, illustrating by way of example the principles of the invention.

In yet another embodiment, a computer readable medium has program instructions for executing an application having at least a first thread and a second thread, the application executing a non-synchronized procedure. The first thread executes an outer software module while the second thread executes an inner software module. A processing state of the second thread code is preserved before the second thread is configured to release an outer monitor of the outer software module. The first thread acquires the outer monitor of the outer software module so that actions may be completed. Upon completion of actions by the first thread, the outer monitor of the outer software module is released. The processing state of the second thread is restored, such that, actions of the second thread are allowed to be completed.

BRIEF DESCRIPTION OF THE DRAWINGS

The invention may best be understood by reference to the following description taken in conjunction with the accompanying drawings in which.

DETAILED DESCRIPTION

The present invention relates to the management of nested monitor locks within a multi-threaded software program. The method of nested monitor lock management allows an internal software module to release an outer monitor lock whenever a known sequence of processing steps precedes the outer monitor release, and it is known by context that it is safe to release the outer monitor. To facilitate this, a thread's processing state is preserved and restored whenever an internal software module releases and then reacquires an outer monitor lock.

It will be obvious, however, to one skilled in the art, that the present invention may be practiced without some or all of these specific details. In other instances, well known process operations have not been described in detail in order not to unnecessarily obscure the present invention.

Because Java™ applications require MI and MO cooperation, an aspect of the invention is to prevent deadlock situations where threads wait indefinitely for the release of MI and MO, which because of processing logic never occurs. The following embodiments describe a method for managing nested monitors in a multi-threaded application.

Figure 1:
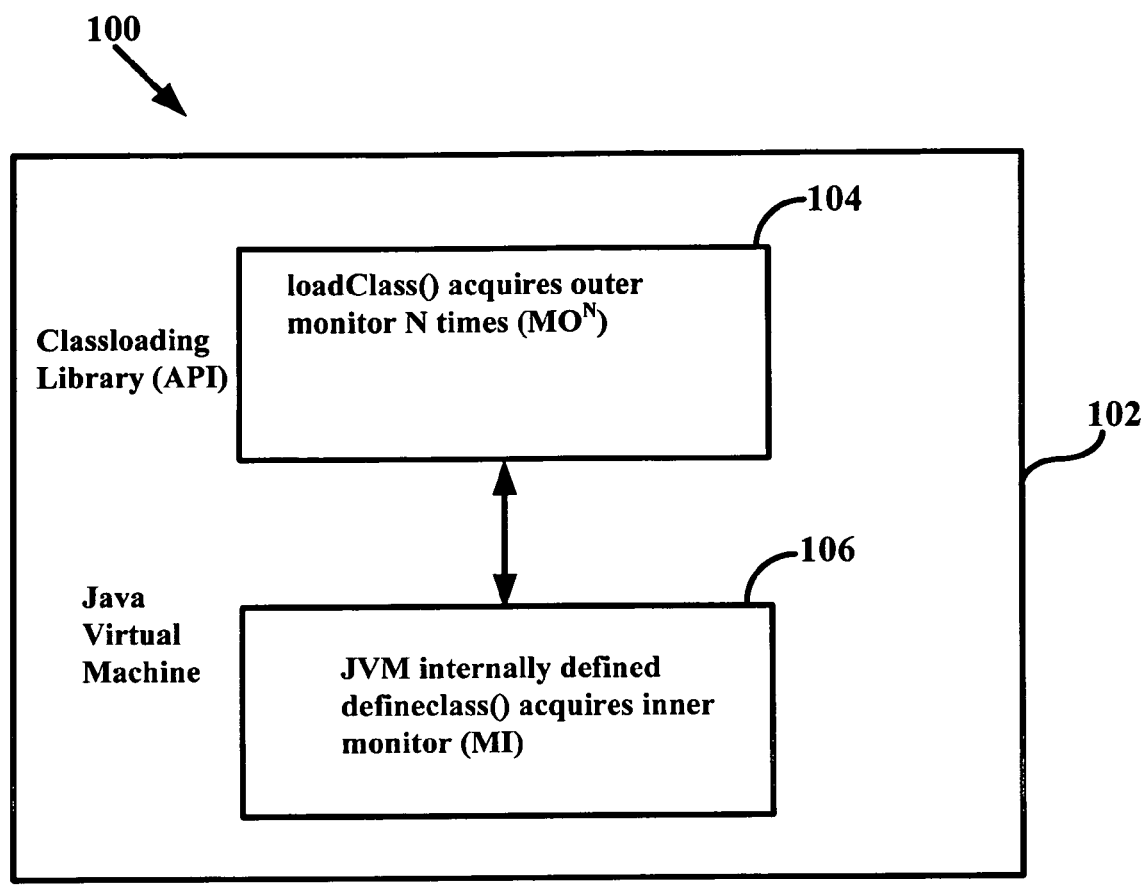
FIG. 1 is a conceptual block diagram of a computer system in which a Java ClassLoading library is called by the JVM.
Figure 2A:
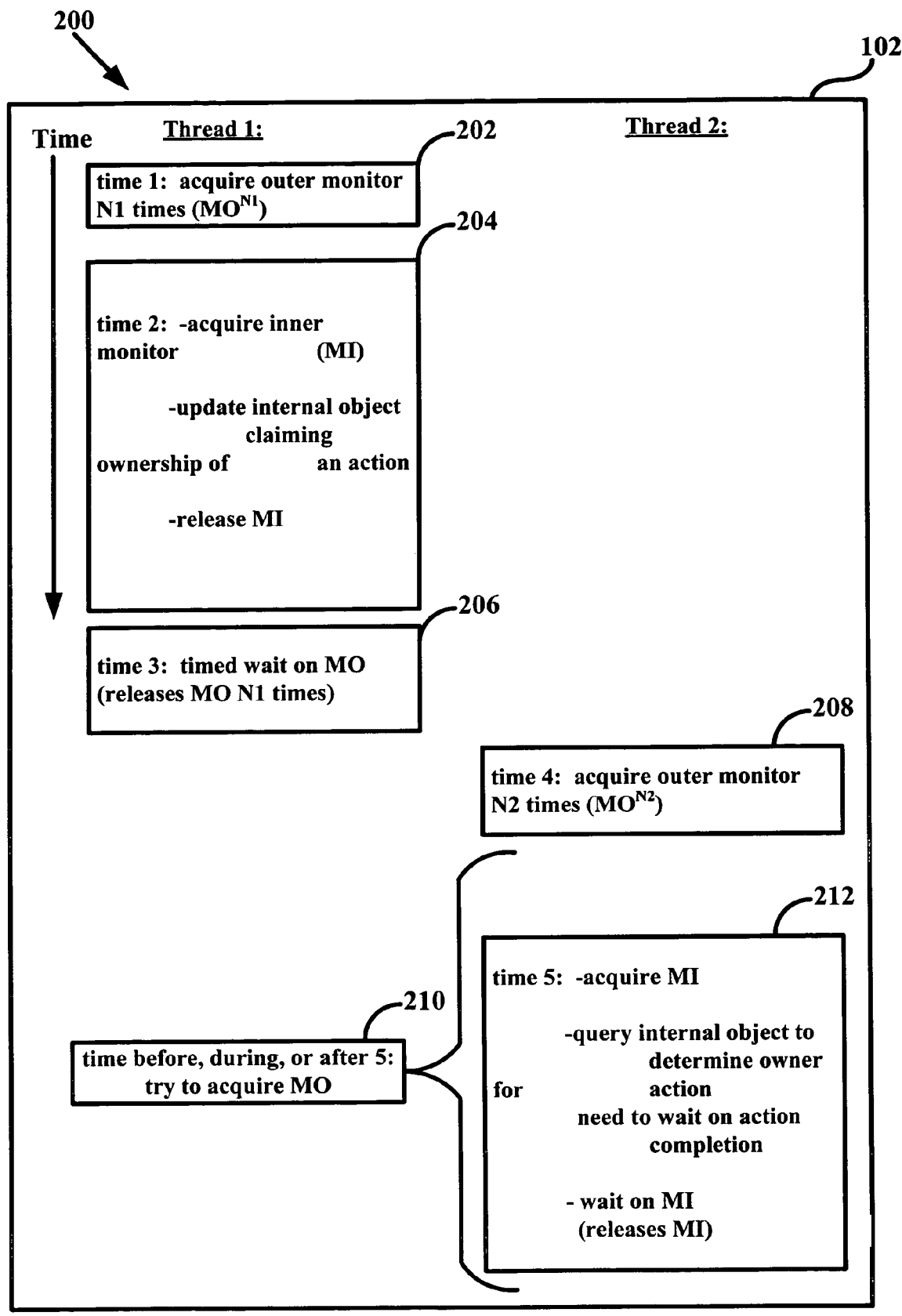
FIG. 2A is a conceptual block diagram of a multi-threaded program created with a custom class loader.

In one embodiment, FIG. 2A shows a block diagram showing the processing operations of a custom class loader that leads to an eventual deadlock 200. As shown in FIG. 2A, multiple threads of operation are running on computer system 102 because a custom class loader has created parallel class loading threads. Thread 1 begins a processing operation 202 which can acquire the MO of ClassLoading library 104 multiple times. Then Thread 1 begins a processing operation 204 that acquires the MI of JVM 106. After Thread 1 has updated the internal object claiming ownership (i.e., lock) of an action, Thread 1 releases the MI. Thread 1 then begins a processing operation 206 which issues a wait( ) with a timeout parameter thereby freeing all copies of the MO of ClassLoading library 104 and causes Thread 1 to be in a waiting state until it receives a notify( ) or it receives a timeout notification.

After Thread 1 exits processing operation 206, Thread 2 begins a processing operation 208 which can acquire the MO of ClassLoading library 104 multiple times. Thread 1 may then begin a processing operation 210 which attempts to acquire the MO of ClassLoading library 104 before, during, or after Thread 2 has begun a processing operation 212. Processing operation 212 first acquires the MI of JVM 106. Then Thread 2 in processing operation 212 queries the internal object to determine the owner for an action. Because Java™ permits only one thread to process a class/class loader pair at a time, Thread 2 needs Thread 1 to complete its action before Thread 2 can process its class/class loader pair. Thread 2 then issues a wait( ) that releases MI of JVM 106.

After time 5, Thread 2 is waiting for Thread 1 to complete its transaction while Thread 1 in turn is waiting for Thread 2 to release the MO of ClassLoading library 104. Thread 1 will never receive the MO of ClassLoading library 104. Since both threads are deadlocked, the application fails to continue execution.

Figure 2B:
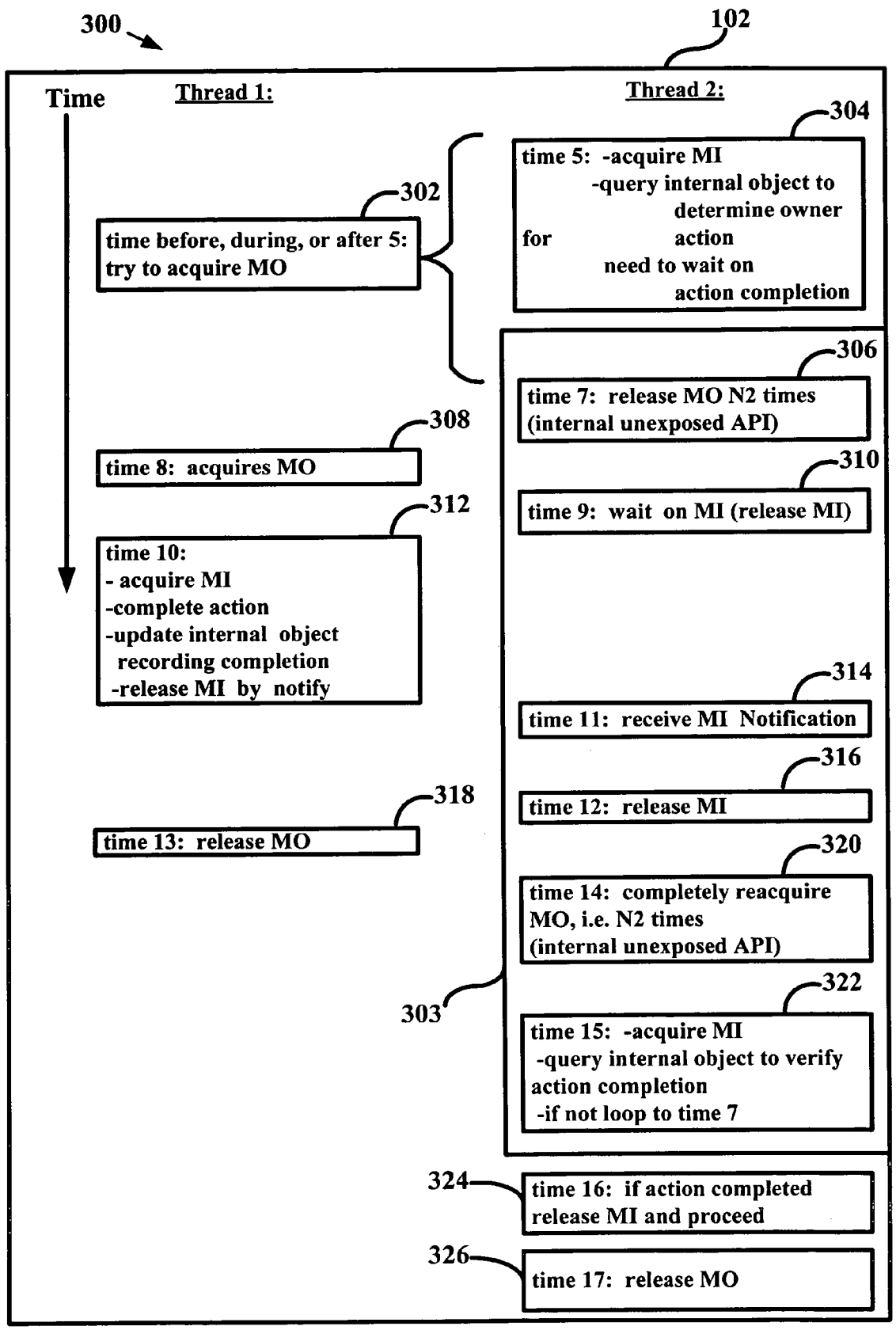
FIG. 2B is a block diagram of a multi-threaded program created with a custom class loader, in accordance with one embodiment of the present invention.

In one embodiment, FIG. 2B illustrates a block diagram of the processing operations performed by a custom class loader to complete processing without a deadlock 300. As shown in FIG. 2B, multiple threads of operation are running on computer system 102 because a custom class loader has created parallel class loading threads. Although not illustrated in FIG. 2B, the processing operations of times 1 through 4 are the same as in FIG. 2A.

Thread 1 begins a processing operation 302 which attempts to acquire the MO of ClassLoading library 104 before, during, or after Thread 2 has begun a processing operation 304. Processing operation 304 first acquires the MI of JVM 106. Then Thread 2 in processing operation 304 queries the internal object to determine the owner for an action. As used herein, the term "action" shall mean the update of any critical path of code or any update to any critical data structure.

Because Java™ permits only one thread to process a class/class loader pair at a time, Thread 2 needs Thread 1 to complete its action before Thread 2 can process its class/class loader pair. After processing operation 304 has completed, Thread 2 begins a processing operation 306 which can release the MO of ClassLoading library 104 multiple times, i.e. the total number of times that Thread 2 has acquired MO. Once the MO of ClassLoading library 104 is released, Thread 1 begins a processing operation 308 which acquires the MO of ClassLoading library 104. After Thread 2 releases MO in processing operation 306, Thread 2 begins a processing operation 310 which issues a wait( ) on MI thereby releasing the MI of JVM 106.

Once Thread 2 has completed processing operation 310, Thread 1 begins a processing operation 312 that acquires the MI of JVM 106. After the MI of JVM 106 has been acquired, Thread 1 completes its action and updates the internal object recording completion. Thread 1 then releases the MI of JVM 106 by issuing a notify( ). After the MI of JVM 106 has been released, Thread 2 then begins a processing operation 314. Because of the Thread 1 notify( ), Thread 2 receives the MI of JVM 106 that thread 2 had previously issued the wait( ) for in operation 310. Thread 2 then begins a processing operation 316 which releases the MI of JVM 106. After Thread 1 issues the notify on MI in processing operation 312, Thread 1 then begins a processing operation 318 which releases the MO of ClassLoading library 104.

Once Thread 1 has completed operation 318, Thread 2 begins a processing operation 320 which can reacquire the MO of ClassLoading library 104 the saved number of times Thread 2 released the MO of ClassLoading library 104 earlier in operation 306. After the MO of ClassLoading library 104 has been acquired, Thread 2 then begins a processing operation 322 which acquires the MI of JVM 106. After this, Thread 2 queries the internal object to verify action completion. If the action has not completed, Thread 2 will loop back to processing operation 306. Otherwise, Thread 2 will begin a processing operation 324 which will release the MI of JVM 106. After processing operation 324 completes, Thread 2 will begin a processing operation 326 that releases the MO of ClassLoading library 104.

Once time 17 has completed, neither Thread 2 nor Thread 1 is waiting for the release of either the MO of ClassLoading library 104 or the MI of JVM 106. Therefore, the JVM is not deadlocked and the application can continue to execute.

In one embodiment, encapsulated operation 303 illustrates features of the invention that facilitate the management of nested monitor locks. Within encapsulated operation 303, two unexposed JVM APIs are provided that permit Thread 2 to release and reacquire the MO, restoring the original number of times the lock was acquired, without invoking a wait( ). To facilitate this, the JVM APIs retain and restore the recursion lock count information of a thread which temporarily releases an MO. This is important because a thread can only wait on a single monitor, and the thread needs to wait on the internal monitor in this case of nested monitors. By doing this, a wait for both nested monitors can be simulated in a manner permitting the thread to continue processing at the point where it temporarily stopped once both monitors are reacquired by the thread. The order of lock release and acquisition in encapsulated operation 303 is also important, to ensure that the thread follows the lock ordering rules to not cause further deadlock problems.

In accordance with one embodiment it is assumed that this internal release is a safe operation because custom class loading follows a known sequence of steps and these steps preceded the release of the MO. This mechanism can only be applied where it is known from context to not break processing logic. Since the new JVM API is not exposed, a user is unaware of the internal APIs that enable operations performed by the JVM. This prevents the possibility of users breaking code by accessing the JVM API.

By doing this it is possible to release the lock that caused a deadlock situation.

Figure 3:
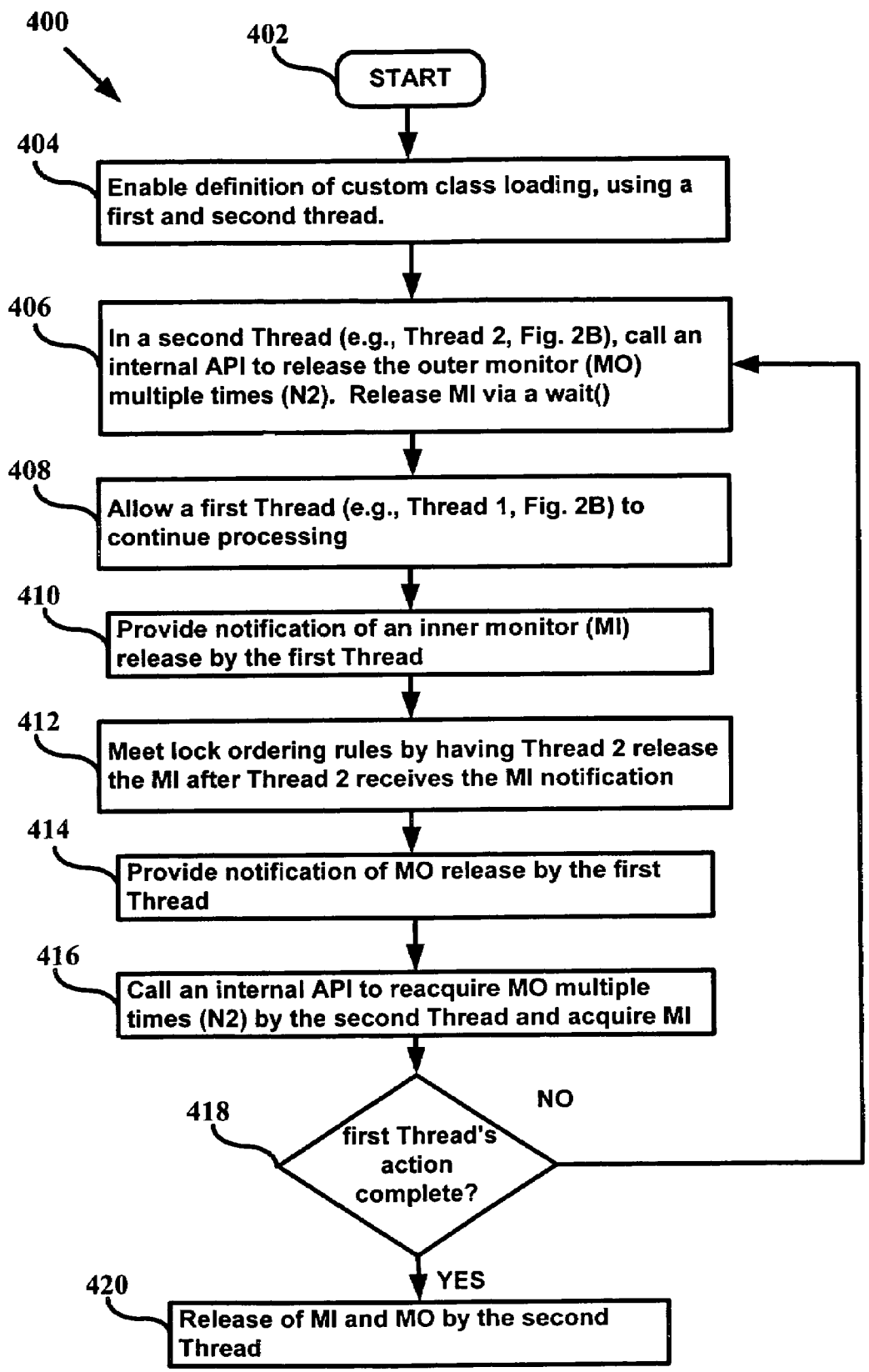
FIG. 3 is a flow chart of a nested monitor procedure used in accordance with one embodiment of the present invention.

FIG. 3 is a flowchart showing a method 400 for managing nested monitor locks with a custom class loader in accordance with an embodiment of the present invention. In an initial operation 402, preprocess operations are performed. Preprocess operations can include, for example, the conversion of bytecodes into machine language and other preprocess operations that will be apparent to those skilled in the art.

In operation 404, the definition of custom class loading is initiated using a first and second thread. Encapsulated within operation 404 is the sequence of operations which a custom class loader will follow, which cause the MO to be acquired by a second thread that did not initiate the class loading actions.

In operation 406, the second Thread running in the JVM releases the MO the total number of times it has acquired it, and releases the MI via a wait( ) operation. This allows the first Thread to continue processing as illustrated in operation 408. After the first Thread completes its processing, the first Thread issues a notify( ) as illustrated in operation 410.

After the notify( ) is received by the second Thread, the second Thread explicitly releases MI in order to follow the lock ordering rules. This sequence is illustrated in operation 412. The first Thread releases the MO in operation 414. With both MO and MI released by the first Thread, the second Thread is free to reacquire both monitors to continue processing. This is illustrated in operation 416. Specifically, the second Thread must reacquire MO the same number of times it was originally owned. As shown in operation 418, a check is then made to see if the first Thread's action has completed. If the first Thread's action has completed, the second Thread will complete it's actions and release both MO and MI as shown in operation 420. Otherwise, the process will loop back to operation 406.

The new process allows the release of a caller module's MO by a callee module in order to allow progress by another thread. In the embodiment illustrated by FIG. 2B, the callee module releasing the MO is the JVM 106 and the caller module is the Classloading library 104.

To facilitate the process, a thread's processing state must be preserved before the MO is released. When a thread temporarily releases the MO completely, the recursive lock count indicates how many nested MO acquisitions have occurred. Later, the paused thread may continue its processing at the point where it had previously stopped by using the recursive lock count information. This permits Thread 2 to continue its processing under the expected safety of the MO lock.

Therefore, the JVM APIs retain the recursive lock count when a thread completely releases a monitor and restores the recursive lock count when the thread, reacquires the monitor. By calling these APIs, when it is identified by context to be safe, a thread operating in the JVM 106 may safely release the MO of Classloading library 104.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as a computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the invention.

What is claimed is:

1. A computer readable medium comprising computer readable code embodied therein for managing nested monitor locks in a computer program, the computer readable code when executed for causing a computer system to:

execute an application having at least a first thread and a second thread, the first thread executing an outer software module and the second thread executing an internal software module, wherein a non-synchronized procedure is processed by the application, the non-synchronized procedure enabling the second thread to acquire an outer monitor of the outer software module and an inner monitor of the internal software module, and depend on the first thread to complete an action of the first thread that requires using the outer monitor of the outer software module and the inner monitor of the internal software module;

call an internal API during execution by the second thread, the internal API saving a recursion lock count of the second thread and the second thread releasing the outer monitor of the outer software module once the recursion lock count has been saved, wherein the recursion lock count identifies a number of times the second thread acquired the outer monitor;

initiate a release of the inner monitor of the internal software module by the second thread, the second thread pausing the actions of the second thread until the second thread can reacquire the inner monitor of the internal software module;

complete the action of the first thread after the outer monitor of the outer software module and the inner monitor of the internal software module are released by the second thread, the completing of the action of the first thread being allowed as the outer monitor of the outer software module and the inner monitor of the internal software module were released by the second thread, and wherein the first thread releasing the outer monitor of the outer software module and the inner monitor of the internal software module once the action of the first thread has completed;

notify the second thread of the release of the outer monitor of the outer software module by the first thread, the second thread releasing the inner monitor of the internal software module after the notification is received;

call the internal API to restore the recursion lock count of the second thread, the recursion lock count of the second thread being previously stored by the internal API, wherein restoring the recursion lock count restores the number of times the second thread acquires the outer monitor; and complete the actions of the second thread, the second thread being allowed to complete its actions after the recursion lock count of the second thread has been restored and after the second thread reacquires the outer monitor of the outer software module and the inner monitor of the internal software module.

2. The computer readable medium as recited in claim 1, wherein the internal API is an unexposed Java™ Virtual Machine (JVM) API.

3. The computer readable medium as recited in claim 1, wherein the second thread releases the outer monitor of the outer software module more than one time.

4. The computer readable medium as recited in claim 1, wherein the second thread reacquires the outer monitor of the outer software module more than one time.

5. The computer readable medium as recited in claim 1, wherein the internal software module is a Java™ Virtual Machine (JVM).

6. The computer readable medium as recited in claim 1, wherein the outer software module is a ClassLoading library.

7. The computer readable medium as recited in claim 1, wherein the non-synchronized procedure is a custom class loading method capable of breaking a serialized process.

* * * * *